US012435547B2

(12) United States Patent
Tsai

(10) Patent No.: US 12,435,547 B2
(45) Date of Patent: Oct. 7, 2025

(54) LOCK WITH ADJUSTABLE CABLE

(71) Applicant: JAE YOU CO., LTD., Tainan (TW)

(72) Inventor: Cheng Tao Tsai, Tainan (TW)

(73) Assignee: JAE YOU CO., LTD., Tainan (TW)

( * ) Notice: Subject to any disclaimer, the term of this patent is extended or adjusted under 35 U.S.C. 154(b) by 78 days.

(21) Appl. No.: 18/389,788

(22) Filed: Dec. 20, 2023

(65) Prior Publication Data

US 2025/0207435 A1 Jun. 26, 2025

(51) Int. Cl.
*E05B 73/00* (2006.01)
*E05B 37/02* (2006.01)

(52) U.S. Cl.
CPC .......... *E05B 73/0005* (2013.01); *E05B 37/02* (2013.01)

(58) Field of Classification Search
CPC .. E05B 73/0005; E05B 73/0082; E05B 37/02; E05B 37/025; E05B 67/003; E05B 71/00; Y10T 70/40; Y10T 70/5009; Y10T 70/483
See application file for complete search history.

(56) References Cited

U.S. PATENT DOCUMENTS 2,729,418 A * 1/1956 Maynard .................. B64C 1/20 410/102
4,597,273 A * 7/1986 Reichenberger ..... A63C 11/005 70/30
5,899,099 A * 5/1999 Tsai ........................ E05B 37/10 70/30
6,026,664 A * 2/2000 Lin ....................... E05B 67/003 70/49
6,305,197 B1 * 10/2001 Ling .................. E05B 73/0005 70/30
6,386,005 B1 * 5/2002 Kuo ...................... E05B 37/025 70/30
6,799,446 B1 * 10/2004 Tsai ........................ E05B 37/02 70/306
7,805,969 B2 * 10/2010 Poppe .................. E05B 19/205 70/435
10,392,835 B2 * 8/2019 Ramakrishna ........ E05B 67/003
11,808,060 B2 * 11/2023 Schroll ................ E05B 67/003
2005/0262904 A1 * 12/2005 Ling ..................... E05B 67/003 70/49
2017/0166274 A1 * 6/2017 Chen ...................... B62H 5/003
2019/0218823 A1 * 7/2019 Tsai ...................... E05B 37/025

* cited by examiner

*Primary Examiner* — Carlos Lugo

(57) ABSTRACT

A lock with adjustable cable includes a lock base having a notch with a radius respectively on two opposite outer walls of the lock base, a rod sleeve disposed with an insertion slot assembled in the lock base; a lock component including a cable fastening portion consisted of a buckle hole, a stuck teeth with an inclined surface on one literal side of the stuck teeth and a partially vertical surface on the other literal side of the stuck teeth, assembled in the rod sleeve, an arrow on outer surface of the cable fastening portion, a stopper at the other end of the cable fastening portion, a steel cable fixed on an outer side of the stopper, and a fixed base assembled on the lock base and the other end of the rod sleeve. The loop length of the cable can be adjusted per a target object.

4 Claims, 11 Drawing Sheets

LOCK WITH ADJUSTABLE CABLE

BACKGROUND OF THE PRESENT INVENTION

Field of Invention

The present invention relates to a lock with adjustable cable, in particular to a lock which cable of the lock is able to be adjusted its' loop length by an article in order to secure them firmly.

Description of Related Arts

The general cable lock 1 is mainly composed of a lock body 10 and a steel cable 11, one end of the steel cable 11 is fixed on the lock body 10, and the other end of the steel cable 11 is the lock end 12, which is movable and buckled on the lock body 10, by the steel cable 11 circling around the target article, such as bicycle, cart, door handle and so on, in case of securing, the lock end 12 of the steel cable 11 is inserted into the lock body 10, the article can be locked and positioned, and the thief can be prevented from stealing the article. However, the length of the steel cable 11 of the conventional cable lock 1 is fixed which means cannot the length can't be adjusted according to the size of the article while securing, so the article in condition of securing is still movable, and there is a room between the steel cable 11 and the article so that the steel cable 11 is easily to be cut off in case of stealing. Therefore, it cannot effectively achieve the desired anti-theft effect.

SUMMARY OF THE PRESENT INVENTION

The main purpose of the present invention is to provide a lock with adjustable cable that can effectively solve the shortcomings of the conventional cable lock during use.

The structure of lock with adjustable cable of the present invention includes:

a lock base, wherein the lock base has a receiving chamber disposed therein, a through hole provided in the receiving chamber, and a notch with an radius deposed on one outer end of the notch respectively provided on two opposite outer walls of the lock base;

a rod sleeve, assembled in the lock base, wherein the rod sleeve has an insertion slot disposed thereon, a first pin hole communicated with the insertion slot provided on a wall of the rod sleeve, a first pin inserted into the first pin hole, a positioning flange provided on one end of the rod sleeve, and a second pin hole provided on the other end of the rod sleeve;

a lock component, assembled in the rod sleeve, wherein the lock component has a cable fastening portion disposed thereon, a buckle hole designed in long oval shape and a circle shape in middle of the buckle hole and a stuck teeth with an inclined surface on one literal side of the stuck teeth and a partially vertical surface on the other literal side of the stuck teeth defined inside of the buckle hole, an arrow provided on outer surface of the cable fastening portion, a lock rod provided at one end of the cable fastening portion, a stopper provided at the other end of the cable fastening portion, and a steel cable fixed on an outer side of the stopper, wherein one side of the stuck teeth of the buckle hole is corresponding to the other side which doesn't contain an radius, of the notch of the lock base, wherein the height of the buckle hole of the cable fastening portion is greater than the height of the notch of the lock base, wherein the lock rod has a limiting groove provided on the wall thereof for the first pin to be inserted into, wherein the steel cable is a steel cable body, which is covered with a covering layer made of a plastic material; and a fixed base, assembled on the lock base and the other end of the rod sleeve, wherein the fixed base has a positioning groove provided therein for the rod sleeve to be inserted, a third pin hole provided on an outer wall of the fixed base, and a second pin inserted into the third pin hole and the second pin hole of the rod sleeve.

According to the lock with adjustable cable of the present invention, the lock base has a set of numbered rotary discs arranged thereon for locking the lock rod of the lock component, wherein the rod sleeve has a cut slot communicated with the insertion slot provided on the wall thereof, wherein the lock rod of the lock component has a plurality of protrusions provided thereon, wherein the protrusions passed through the cut slot of the rod sleeve work with the set of numbered rotary discs for locking.

According to the lock with adjustable cable of the present invention, the lock component has an elastic member provided on the wall of the lock rod, wherein an outer end of the elastic member resists on the wall of the insertion slot of the rod sleeve.

According to the lock with adjustable cable of the present invention, the lock base has a first indicating protrusion provided on the outer wall thereof.

According the lock with adjustable cable of the present invention, the fixed base has a second indicating protrusion provided on the outer wall thereof.

The advantage of the lock with adjustable cable of the present invention is that it can easily adjust its' loop length according to the size of the article to be secured firmly. Hence, it can prevent thieves from cutting the steel cable with tools.

DETAILED DESCRIPTION OF THE PREFERRED EMBODIMENT

Figure 1:
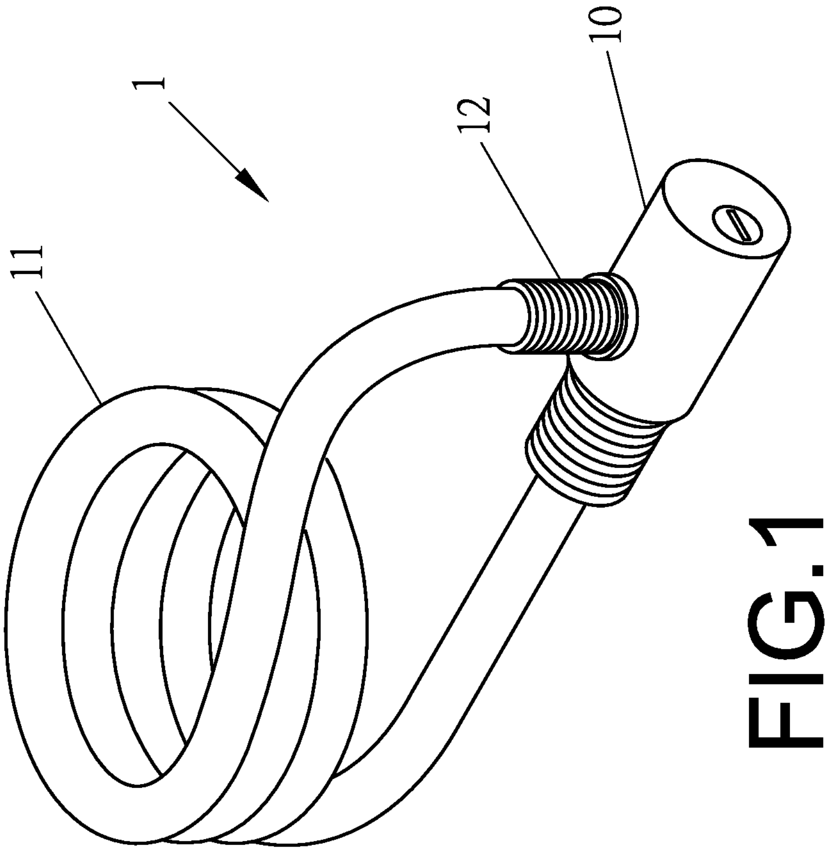
FIG.1 (PRIOR ART)
FIG. 1 is a perspective view of a conventional cable lock.
Figure 2:
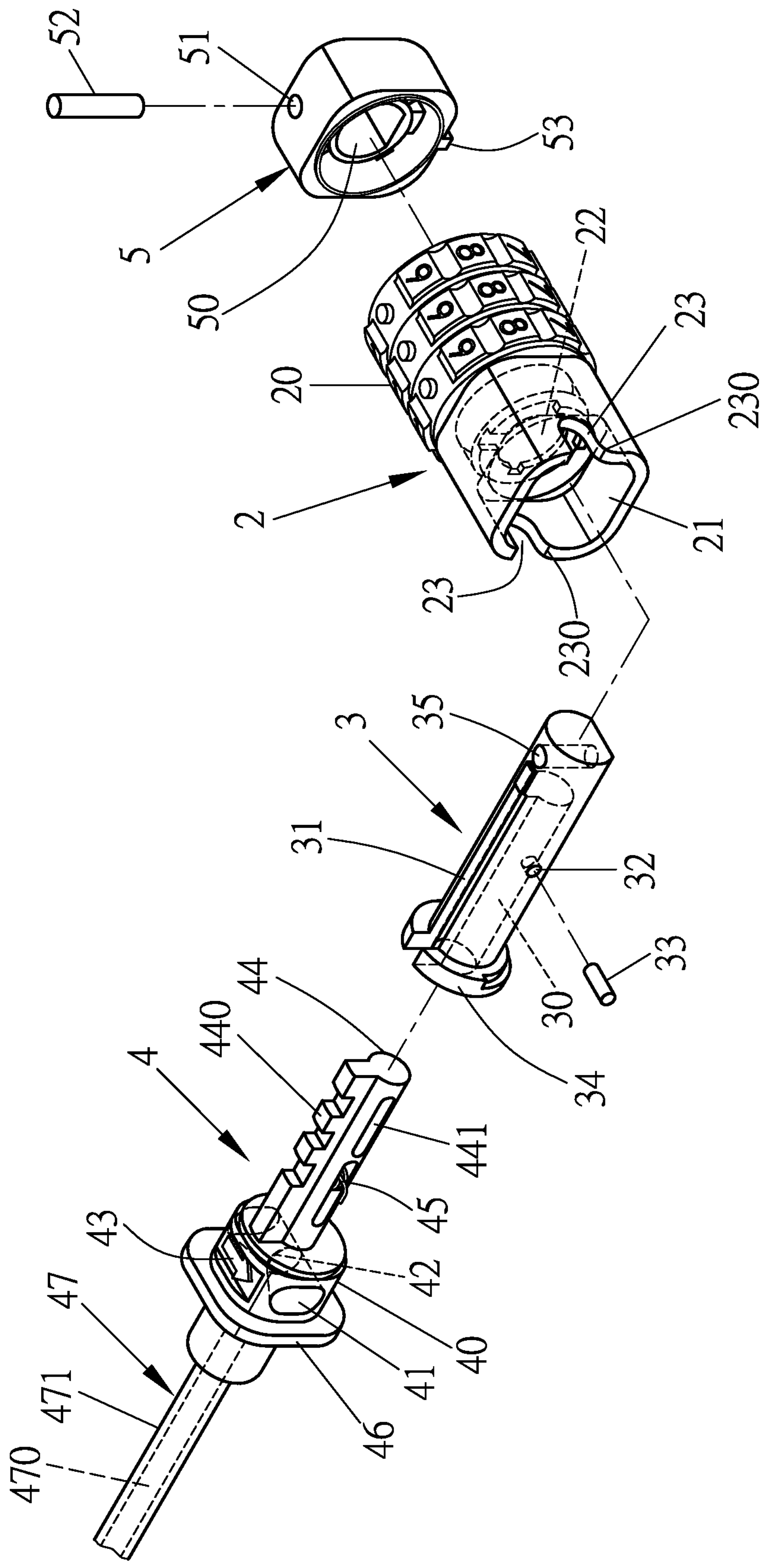
FIG. 2 is an exploded perspective view of an embodiment of the present invention.
Figure 3:
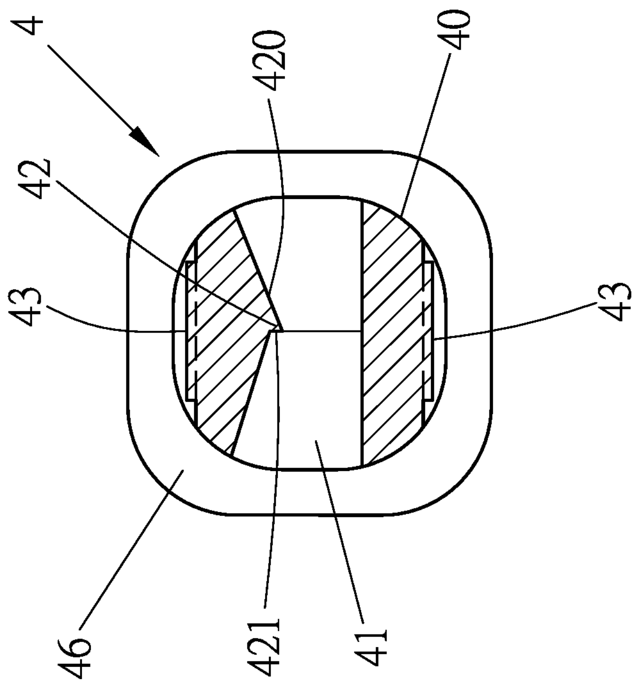
FIG. 3 is a sectional view of the lock component according to the embodiment of the present invention.
Figure 4:
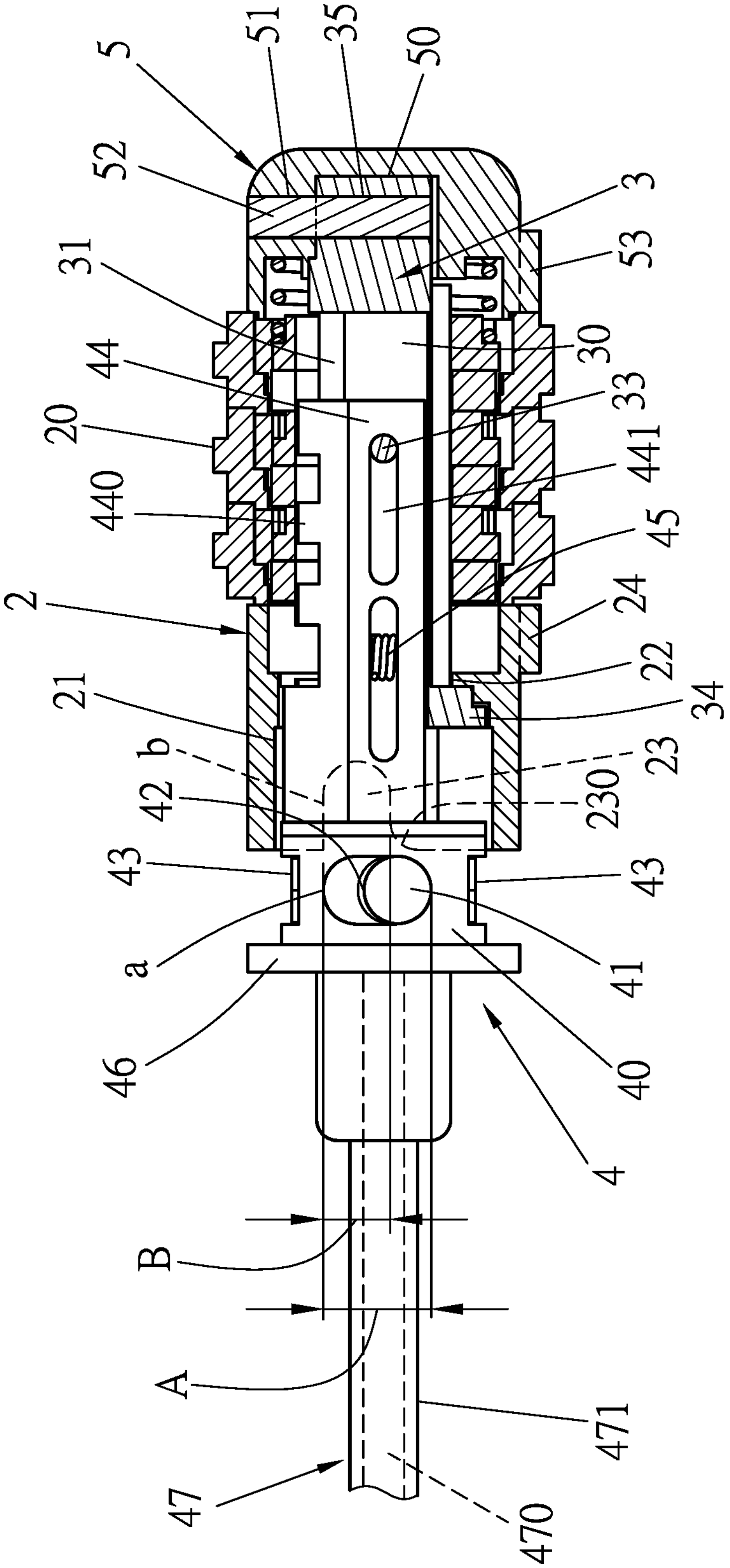
FIG. 4 is an assembled sectional view of the embodiment of the present invention.

In order to achieve the above-mentioned objects and effects of the present invention, the technical means adopted are hereby enumerated through a preferred feasible embodiment, and illustrated in the drawings, detailed as follows:

According to an embodiment of the present invention, referring to FIGS. 2 to 5, the lock includes a lock base 2, wherein the lock base 2 has a set of numbered rotary discs 20 arranged thereon, a receiving chamber 21 disposed in the lock base 2, a through hole 22 provided on an inner surface of the receiving chamber 21 and connected with the set of numbered rotary discs 20, a notch 23 respectively provided on two opposite outer walls of the lock base 2, and a first indicating protrusion 24 provided on the outer wall of the lock base 2, wherein an radius 230 deposed on one outer end of the notch 23; a rod sleeve 3 assembled in the lock base 2, wherein the rod sleeve 3 has an insertion slot 30 disposed thereon, a cut slot 31 communicated with the insertion slot 30 provided on the wall of the rod sleeve 3, a first pin hole 32 communicated with the insertion slot 30 also provided on the wall of the rod sleeve 3, a first pin 33 inserted into the first pin hole 32, a positioning flange 34 provided on one end of the rod sleeve 3, and a second pin hole 35 provided on the other end of the rod sleeve 3; a lock component 4 assembled in the rod sleeve 3, wherein the lock component 4 has a cable fastening portion 40 disposed thereon, a buckle hole 41 in long oval shape with a circle shape in middle of the buckle hole 41 and a stuck teeth 42 with an inclined surface 420 on one literal side of the stuck teeth and a partially vertical surface 421 on the other literal side of the stuck teeth 42 defined inside of the buckle hole (as shown in FIG. 3), an arrow 43 provided on outer surface of the cable fastening portion 40, a lock rod 44 provided at one end of the cable fastening portion 40, an elastic member 45 provided on the wall of the lock rod 44, a stopper 46 provided at the other end of the cable fastening portion 40, and a steel cable 47 fixed on the outer side of the stopper 46, wherein the outer part of the buckle hole 41 is an elliptical shape, and the middle part of the buckle hole 41 is a circle shape, one side a of the stuck teeth 42 of the buckle hole 41 is corresponding to the other side b, which doesn't contain an radius 230, of the notch 23 of the lock base 2, wherein the height A of the buckle hole 41 of the cable fastening portion 40 is greater than the height B of the notch 23 of the lock base 2, wherein the lock rod 44 has a plurality of protrusions 440 provided thereon and a limiting groove 441 provided on the wall thereof, wherein the steel cable 47 is a steel cable body 470, which is covered with a covering layer 471 made of a plastic material; a fixed base 5 arranged on the outside of the set of numbered rotary discs 20 of the lock base 2, wherein the fixed base 5 has a positioning groove 50 provided therein, a third pin hole 51 provided on the outer wall of the fixed base 5, a second pin 52 inserted into the third pin hole 51 and the second pin hole 35 of the rod sleeve 3, and a second indicating protrusion 53 also provided on the outer wall of the fixed base 5. Here is the structure of the lock with adjustable cable.

When assembling the embodiment of the present invention, referring to FIGS. 2~5, the lock rod 44 of the lock component 4 is inserted into the insertion slot 30 of the rod sleeve 3 so that the protrusions 440 of the lock rod 44 are inserted into the cut slot 31 of the rod sleeve 3, and the outer end of the elastic member 45 protruding on the wall of the lock rod 44 elastically resists the wall of the insertion slot 30 of the rod sleeve 3 so that the lock rod 44 will not slide arbitrarily. Then the first pin hole 32 of the rod sleeve 3 is aligned with the limiting groove 441 on the lock rod 44, and the first pin 33 is inserted into the first pin hole 32 of the rod sleeve 3 and the limiting groove 441 of the lock rod 44. The sliding position of the lock rod 44 of the lock component 4 in the rod sleeve 3 can be restricted, and the lock component 4 and the rod sleeve 3 can be assembled without falling out. Then the rod sleeve 3 and the lock rod 44 of the lock component 4 are inserted into the through hole 22 of the lock base 2, and the positioning flange 34 of the rod sleeve 3 is positioned in the receiving chamber 21 of the lock base 2. The other end of the rod sleeve 3 extends through the through hole 22 of the lock base 2 and the set of numbered rotary discs 20. Then the fixed base 5 is arranged on the outer end of the set of numbered rotary discs 20 of the lock base 2 so that the other end of the rod sleeve 3 is inserted into the positioning groove 50 of the fixed base 5. Then, the second pin 52 is inserted into the third pin hole 51 of the fixed base 5 and the second pin hole 35 of the rod sleeve 3. In this way, the entire assembly can be completed.

Figure 5:
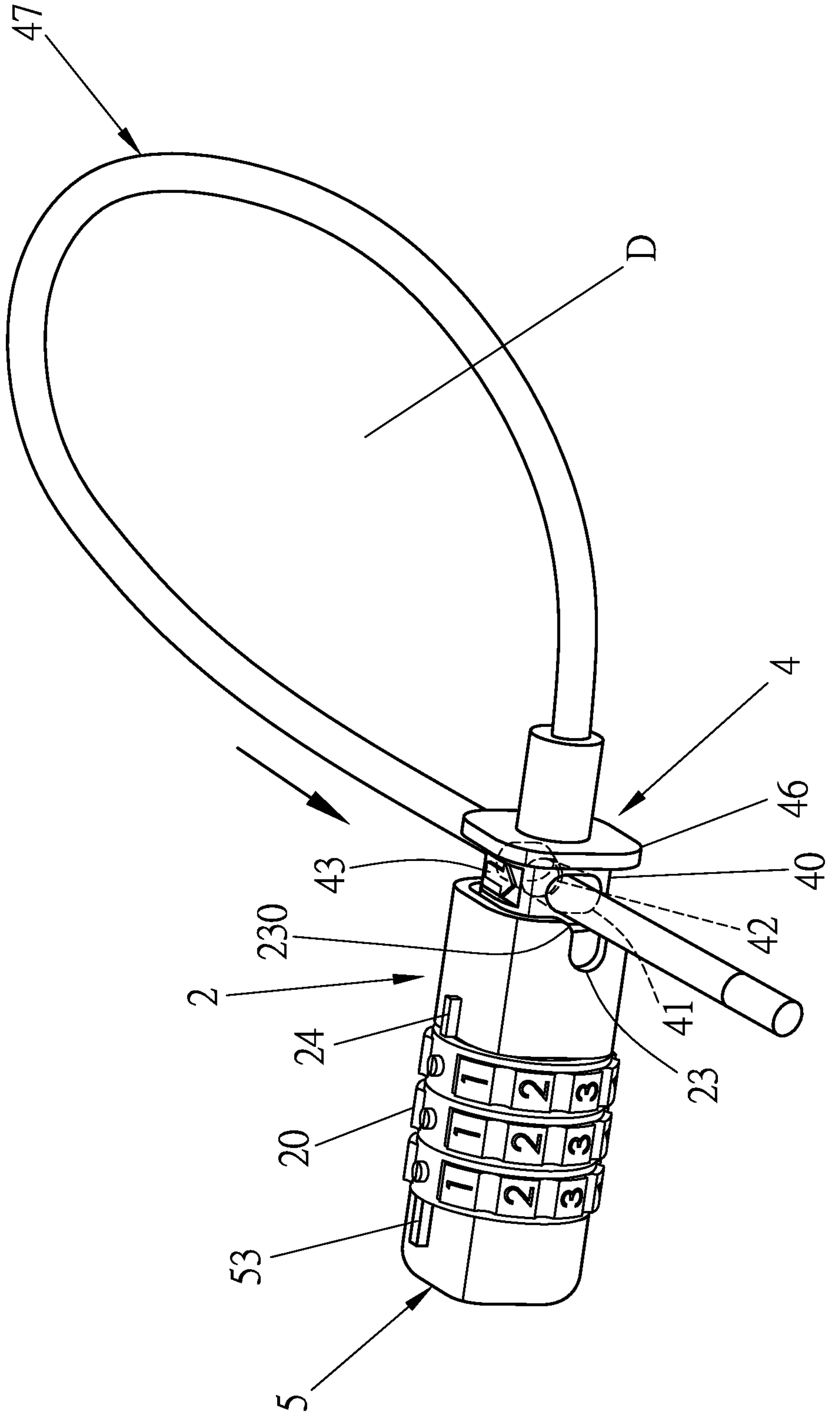
FIG. 5 is a perspective view of a steel cable passing through a buckle hole of a lock component according to the embodiment of the present invention.
Figure 6:
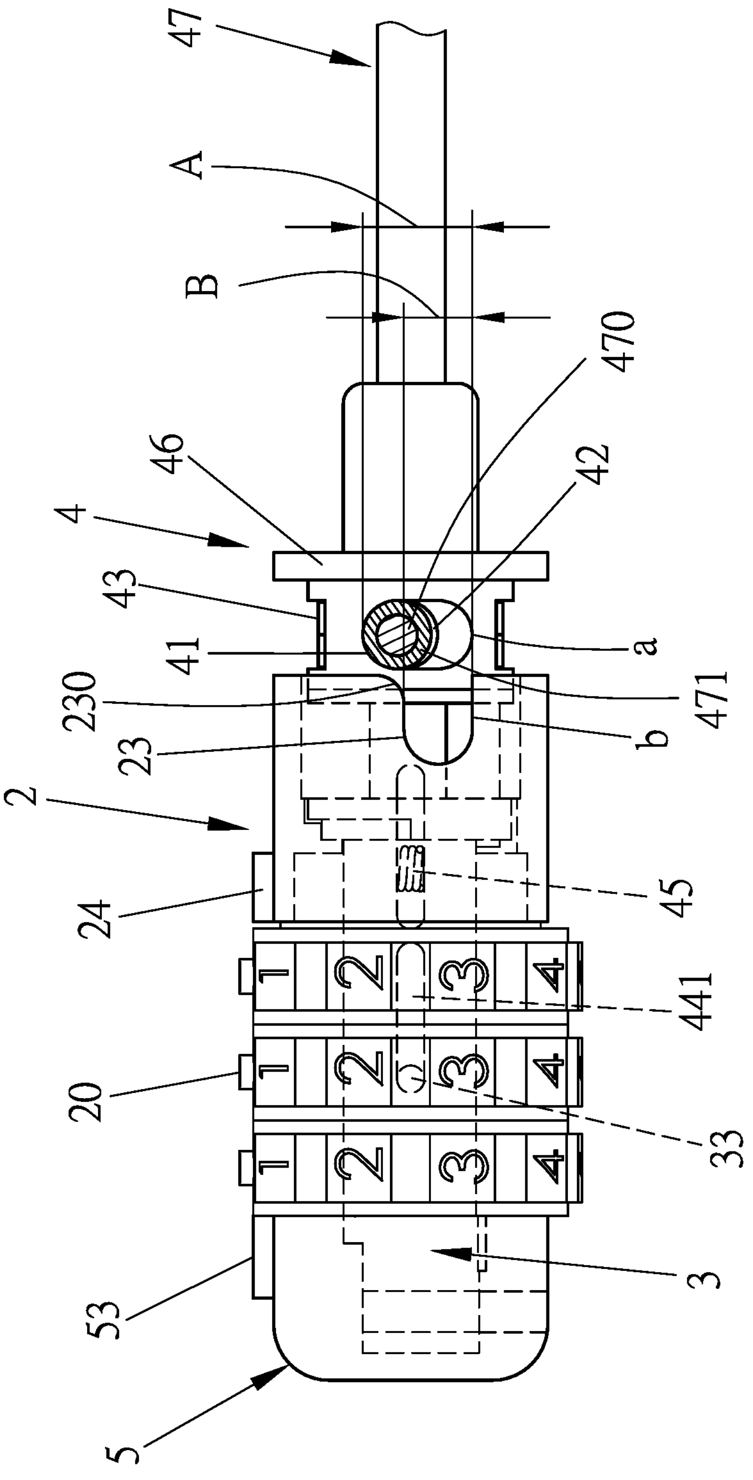
FIG. 6 is a front view of the unlocked embodiment of the present invention.
Figure 7:
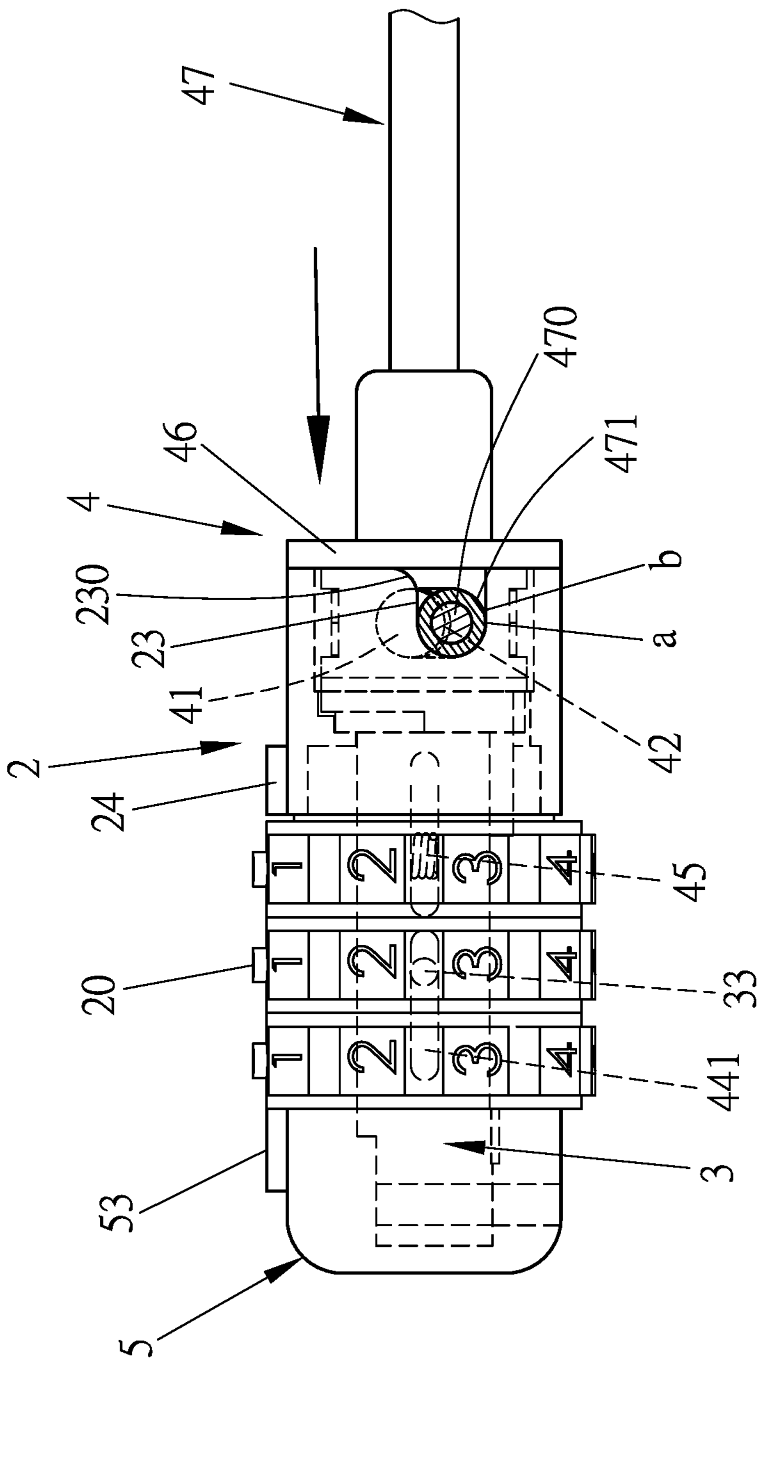
FIG. 7 is a front view of pushing the lock component according to the embodiment of the present invention.
Figure 8:
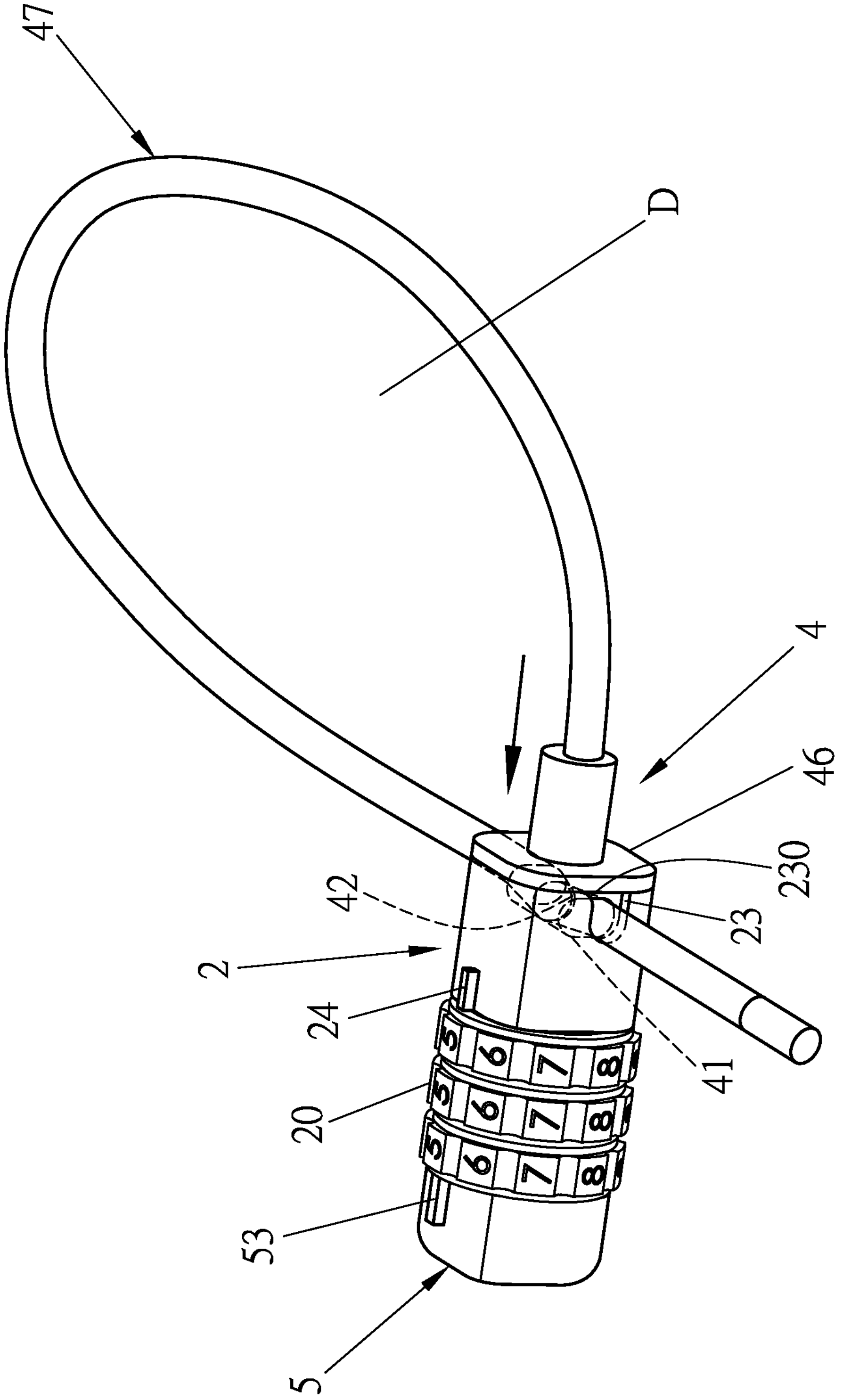
FIG. 8 is a perspective view of the embodiment of the present invention after locking.
Figure 9:
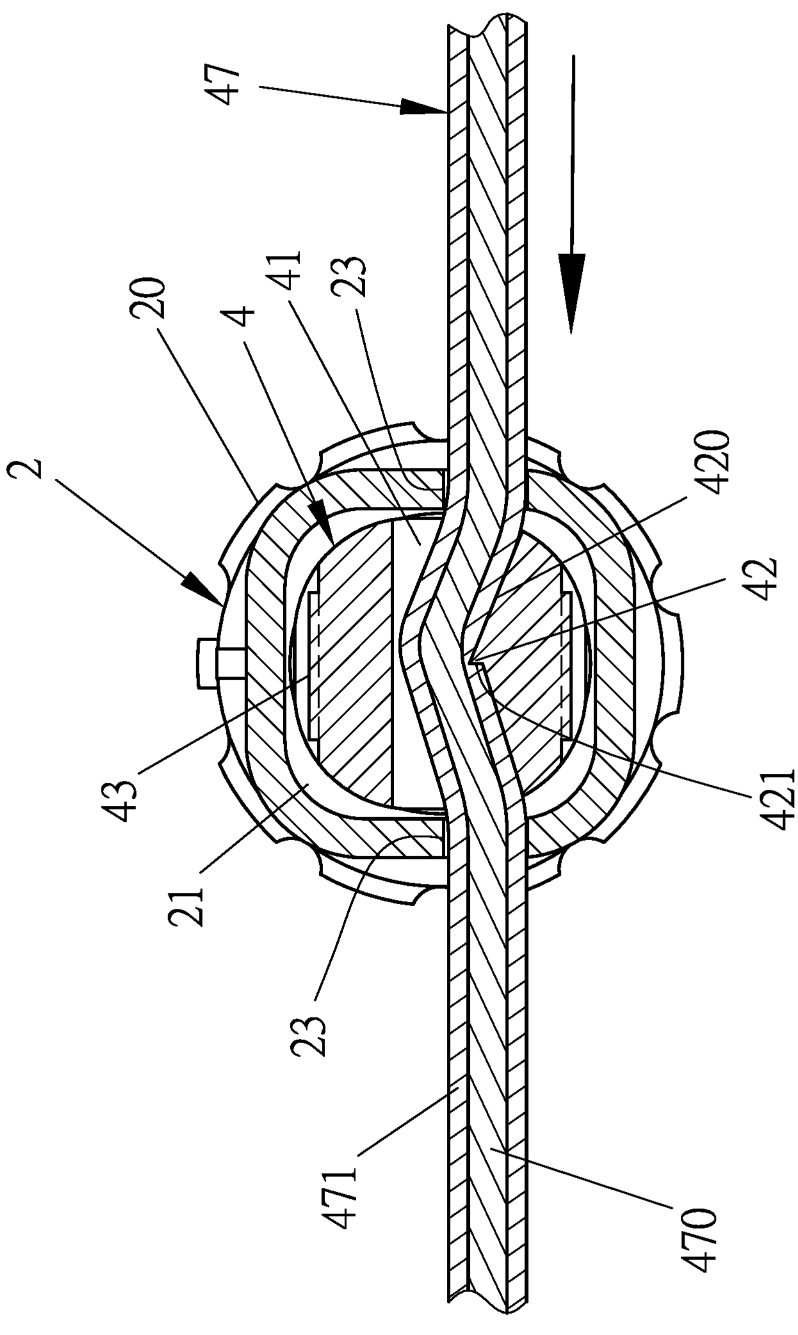
FIG. 9 is a sectional view after locking according to the embodiment of the present invention.

When using the present invention, referring to FIGS. 5 to 9, just circle the steel cable 47 around the target article in case of securing, and then insert the end of the steel cable 47 into the buckle hole 41 of the cable fastening portion 40 by following the direction of the arrow 43 on the lock component 4 and go out from the other end of the buckle hole 41 (as shown in FIGS. 5 and 6), and then push the lock component 4 toward the lock base 2 (as shown in FIGS. 7 and 8), so that the cable fastening portion 40 of the lock component 4 is placed in the receiving chamber 21 of the lock base 2. When the cable fastening portion 40 is pushed towards the lock base 2, the steel cable 47 that passes through the buckle hole 41 guided by the radius 230 on the notch 23 of the lock base 2 and pressed into the notch 23 of the lock base 2. When the steel cable 47 passing through the buckle hole 41 of the lock component 4 is pushed into the notch 23 of the lock base 2, the steel cable is bent by the difference between the height B of the notch 23 of the lock base 2 and the height A of the buckle hole 41, and the covering layer 471 covering the surface of the steel cable body 470 is trapped by the stuck teeth 42 in the buckle hole 41 (as shown in FIG. 9), wherein the covering layer 471 is made of plastic material and prevent from scratching, so it can be stuck by the stuck teeth 42. Since the inclined surface 420 is disposed on one side of the stuck teeth 42, the steel cable 47 is easily inserted into the buckle hole 41, while the vertical surface 421 is partially sed on the other side of the stuck teeth 42, the steel cable 47 cannot be pulled out from the buckle hole 41 in the opposite direction. In this way, due to the bending of the steel cable 47 and the arrangement of the stuck teeth 42, the steel cable 47 can be firmly locked and fixed in the buckle hole 41, while the lock rod 44 extends into the set of numbered rotary discs 20 of the lock base 2, and the set of numbered rotary discs 20 can be rotated to make the numbers disordered, so that the protrusions 440 of the lock rod 44 can be locked and fixed by the set of numbered rotary discs 20, thus the locking procedures can be completed.

Figure 10:
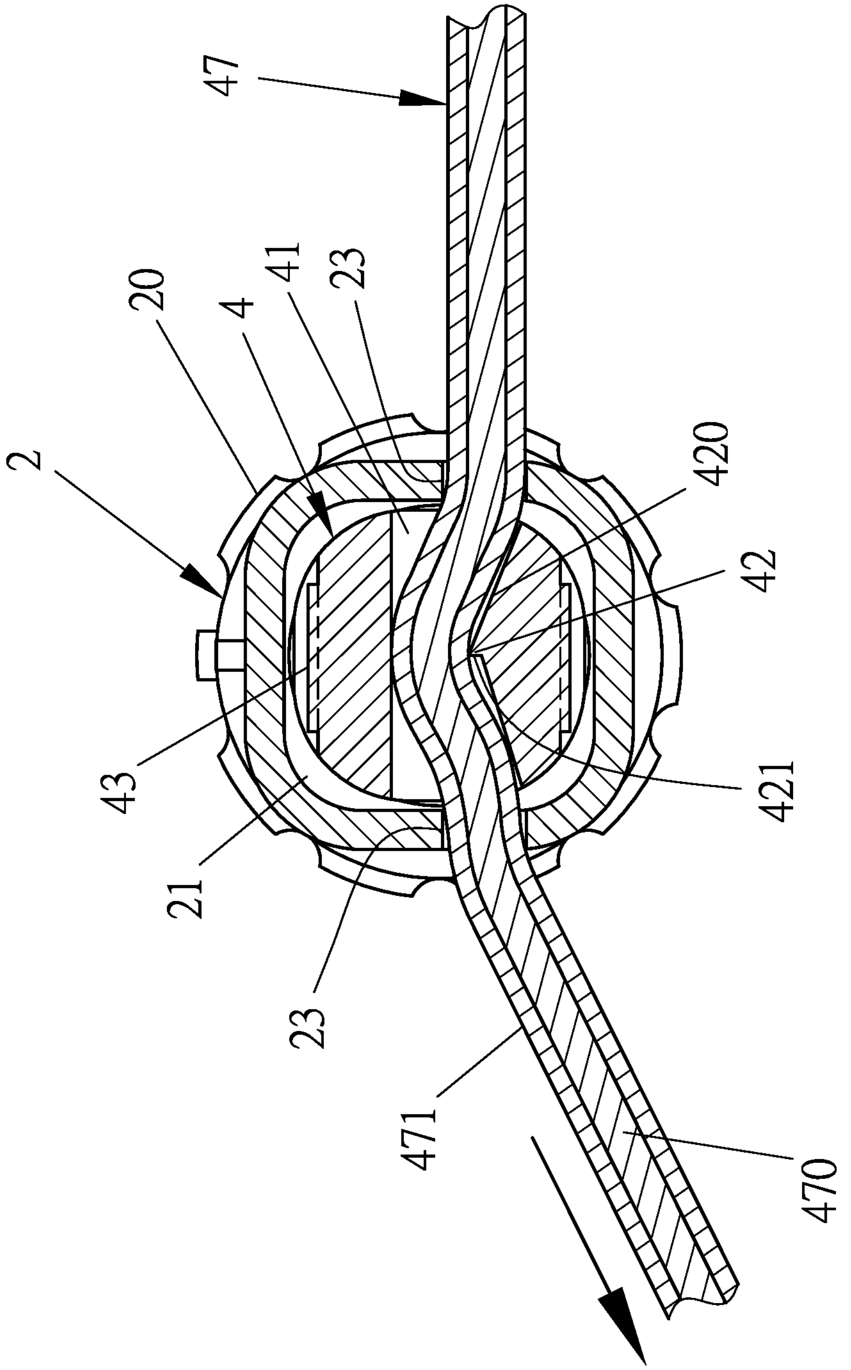
FIG. 10 is a sectional view of bending the steel cable according to the embodiment of the present invention.
Figure 11:
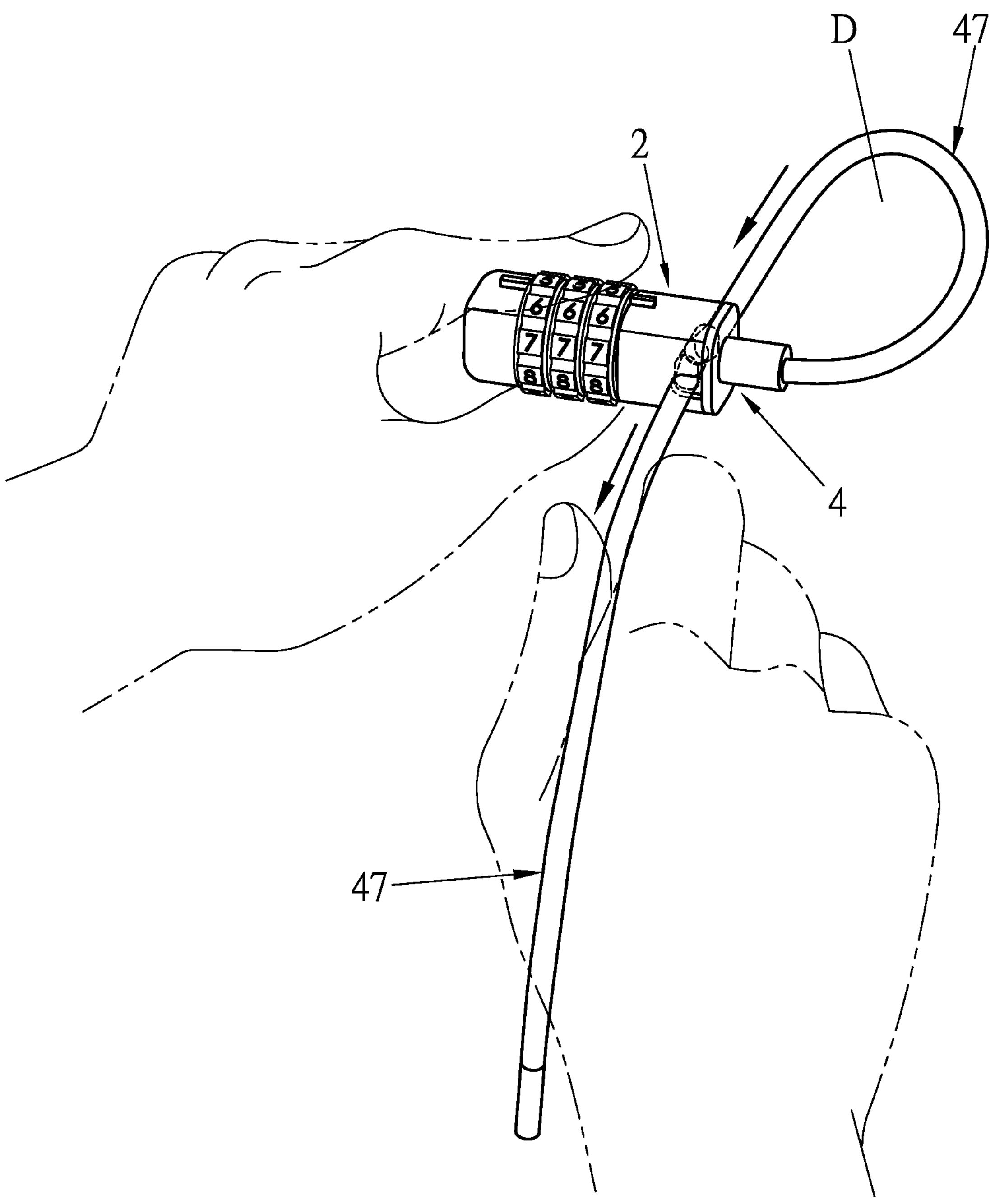
FIG. 11 is a perspective view of adjusting the size of the loop of the steel cable according to the embodiment of the present invention.

After the embodiment of the present invention is locked, if the size of the loop D of the steel cable 47 is desired to be adjusted, referring to FIGS. 9~10, only need to hold one end of the steel cable 47 that passes through lock base 2 and bends and pulls slightly downward, when the steel cable 47 is bent downward, the covering layer 471 of the steel cable 47 that the stuck teeth 42 of the lock base 2 bites is not hindered by the inclined surface 420 of the stuck teeth 42, the covering layer 471 of steel cable 47 is no longer engaged by the stuck teeth 42 (as shown in FIG. 10), the steel cable 47 can be pulled to reduce the length of the loop D around the locked article (as shown in FIG. 11). If the steel cable 47 is pulled in the reverse direction, the stuck teeth 42 will be stuck into the covering layer 471 of the steel cable 47 again due to the downward pressure, and the steel cable 47 cannot be pulled in the reverse direction, thereby achieving a similar effect to a zip tie. In this way, there is no need to open the lock and readjust the loop D of the steel cable 47. When the lock is in a condition of lock, the steel cable 47 can be directly pulled to reduce the length of the loop D of the steel cable 47, thereby tightening the locked article, so that the gap between the steel cable 47 and the locked article is narrowed to the point that the steel cable 47 cannot be cut off by a tool, and the best anti-theft effect can be achieved.

In summary, the present invention has indeed achieved the expected objects and effects, and is more ideal and practical than those in the art. The above-mentioned embodiment is only specific descriptions for the preferred embodiments of the present invention, the embodiment is not intended to limit the scope of the patent application of the present invention, and all other equivalent changes and modifications accomplished without departing from the technical means disclosed in the present invention shall be covered by the present application.

What is claimed is:

1. A lock with adjustable cable structure, comprising:

a lock base, wherein the lock base has a set of numbered rotary discs arranged thereon, a receiving chamber disposed therein, a through hole provided in the receiving chamber and connected with the set of numbered rotary discs, and a notch with a radius disposed on one outer end of the notch respectively provided on two opposite outer walls of the lock base;

a rod sleeve, assembled in the lock base, wherein the rod sleeve has an insertion slot disposed thereon, a cut slot communicated with the insertion slot provided on the wall of the rod sleeve, a first pin hole communicated with the insertion slot provided on a wall of the rod sleeve, a first pin inserted into the first pin hole, a positioning flange provided on one end of the rod sleeve, and a second pin hole provided on the other end of the rod sleeve;

a lock component, assembled in the rod sleeve, wherein the lock component has a cable fastening portion disposed thereon, a buckle hole, designed in long oval shape with a circle shape in middle of the buckle hole, and a stuck teeth with an inclined surface on one literal side of the stuck teeth and a partially vertical surface on the other literal side of the stuck teeth defined inside of the buckle hole, an arrow provided on outer surface of the cable fastening portion, a lock rod provided at one end of the cable fastening portion, a stopper provided at the other end of the cable fastening portion, and a steel cable fixed on an outer side of the stopper, wherein one side of the stuck teeth of the buckle hole is corresponding to the other side without having an radius of the notch of the lock base, wherein the height of the buckle hole of the cable fastening portion is greater than the height of the notch of the lock base, wherein the lock rod cooperates with the set of numbered rotary discs to lock and unlock, wherein the lock rod has a plurality of protrusions provided thereon and a limiting groove provided on the wall thereof, wherein the protrusions are passed through the cut slot of the rod sleeve, and the protrusions cooperates with the set of numbered rotary discs for locking, wherein the steel cable is a steel cable body, which is covered with a covering layer made of plastic material; and a fixed base, assembled on the lock base and the other end of the rod sleeve, wherein the fixed base has a positioning groove provided therein for the rod sleeve to be inserted, a third pin hole provided on an outer wall of the fixed base, and a second pin inserted into the third pin hole and the second pin hole of the rod sleeve, wherein the lock rod of the lock component is inserted into the insertion slot of the rod sleeve, the first pin hole of the rod sleeve is aligned with the limiting groove on the lock rod, and the first pin is inserted into the first pin hole of the rod sleeve and the limiting groove of the lock rod to limit the sliding position of the lock rod of the lock component in the rod sleeve, wherein the rod sleeve and the lock rod are inserted into the set of numbered rotary discs of the lock base, and the set of numbered rotary discs are rotated to make the numbers disordered, so that the protrusions of the lock rod are locked and fixed by the set of numbered rotary discs, wherein the steel cable is inserted into the buckle hole and is fixed by the stuck teeth, and when the steel cable inserted into the buckle hole is bent downward, the steel cable is no longer engaged by the stuck teeth, so as to adjust the size of the loop of the steel cable.

2. The lock with adjustable cable, as recited in claim 1, wherein the lock component has an elastic member provided on the wall of the lock rod, wherein an outer end of the elastic member resists on the wall of the insertion slot of the rod sleeve.

3. The lock with adjustable cable, as recited in claim 1, wherein the lock base has a first indicating protrusion provided on the outer wall thereof.

4. The lock with adjustable cable, as recited in claim 1, wherein the fixed base has a second indicating protrusion provided on the outer wall thereof.

* * * * *